(12) United States Patent
Hughes et al.

(10) Patent No.: US 11,200,303 B2
(45) Date of Patent: Dec. 14, 2021

(54) AUDIO ACCESSIBILITY ASSISTANCE

(71) Applicant: Apple Inc., Cupertino, CA (US)

(72) Inventors: Gregory F. Hughes, San Jose, CA (US); Anthony J. Chivetta, San Francisco, CA (US); Brett D. George, Mountain View, CA (US); Josh P. de Cesare, Los Gatos, CA (US); Santo S. Sapienza, San Francisco, CA (US); Ion Valentin Pistol, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 458 days.

(21) Appl. No.: 16/144,922

(22) Filed: Sep. 27, 2018

(65) Prior Publication Data

US 2019/0180015 A1  Jun. 13, 2019

Related U.S. Application Data

(60) Provisional application No. 62/596,567, filed on Dec. 8, 2017.

(51) Int. Cl.
| | |
|---|---|
| *G06F 21/32* | (2013.01) |
| *G06F 21/84* | (2013.01) |
| *G06F 21/57* | (2013.01) |
| *G10L 13/00* | (2006.01) |
| *G06F 21/31* | (2013.01) |

(52) U.S. Cl.
CPC .............. *G06F 21/32* (2013.01); *G06F 21/31* (2013.01); *G06F 21/575* (2013.01); *G06F 21/84* (2013.01); *G10L 13/00* (2013.01)

(58) Field of Classification Search
CPC .......... G06F 21/32; G06F 21/31; G06F 21/84; G06F 21/575; G10L 13/00
See application file for complete search history.

(56) References Cited

U.S. PATENT DOCUMENTS

| | | | |
|---|---|---|---|
| 8,511,544 B1 * | 8/2013 | Billett | G06F 21/85 |
| | | | 235/379 |
| 8,775,757 B2 | 7/2014 | Polzin et al. | |
| 8,832,465 B2 | 9/2014 | Gulati et al. | |
| 9,547,778 B1 | 1/2017 | Paaske et al. | |

(Continued)

OTHER PUBLICATIONS

IOS Security—White Paper, iOS 10, Apple Inc., Mar. 2017, 68 pages.

*Primary Examiner* — James R Turchen
(74) *Attorney, Agent, or Firm* — Kowert, Hood, Munyon, Rankin & Goetzel, P.C.

(57) ABSTRACT

Techniques are disclosed relating to providing audio prompts. In one embodiment, a computing device includes a display, an audio circuit coupled to a speaker, first and second processors, and memory. The memory has first program instructions executable by the first processor to provide, via a first operating system of the computing device, a visual prompt to the display to cause the display to present the visual prompt to a user and send, to the second processor, a request to provide an audio prompt corresponding to the visual prompt via the speaker to the user. The computing device also includes memory having second program instructions executable by the second processor to, in response to the request, provide, via a second operating system, an instruction to the audio circuit to play the audio prompt via the speaker.

20 Claims, 9 Drawing Sheets

(56) References Cited

U.S. PATENT DOCUMENTS

| | | | |
|---|---|---|---|
| 10,554,657 B1* | 2/2020 | Siddiqui | G10L 15/22 |
| 2006/0217985 A1* | 9/2006 | Noguchi | G09B 21/006 |
| | | | 704/270 |
| 2006/0271496 A1* | 11/2006 | Balasubramanian | G06Q 20/3821 |
| | | | 705/64 |
| 2010/0083353 A1* | 4/2010 | Wang | G06F 21/36 |
| | | | 726/5 |
| 2011/0314529 A1* | 12/2011 | Bailey, Jr. | G06Q 20/4014 |
| | | | 726/7 |
| 2012/0222100 A1* | 8/2012 | Fisk | G06F 21/36 |
| | | | 726/7 |
| 2012/0246008 A1* | 9/2012 | Hamilton, II | G06Q 30/0241 |
| | | | 705/14.66 |
| 2012/0254940 A1* | 10/2012 | Raper | G06F 21/31 |
| | | | 726/3 |
| 2013/0006626 A1* | 1/2013 | Aiyer | H04M 3/38 |
| | | | 704/235 |
| 2013/0069772 A1* | 3/2013 | Najafi | H04M 1/673 |
| | | | 340/407.1 |
| 2013/0166915 A1* | 6/2013 | Desai | H04L 9/3247 |
| | | | 713/176 |
| 2013/0227262 A1* | 8/2013 | Maya | G06F 21/74 |
| | | | 713/2 |
| 2015/0193776 A1* | 7/2015 | Douglas | G06Q 20/40145 |
| | | | 705/16 |
| 2015/0319153 A1* | 11/2015 | Tartz | H04L 63/08 |
| | | | 726/4 |
| 2016/0048662 A1* | 2/2016 | Arnoud | G06F 21/31 |
| | | | 726/5 |
| 2016/0234204 A1* | 8/2016 | Rishi | H04L 63/0428 |
| 2016/0262017 A1* | 9/2016 | Lavee | H04L 63/083 |
| 2017/0090569 A1* | 3/2017 | Levesque | G06F 3/016 |
| 2017/0214687 A1* | 7/2017 | Klein | H04W 12/065 |
| 2017/0344251 A1* | 11/2017 | Hajimusa | G06F 3/04883 |
| 2018/0063107 A1* | 3/2018 | Gonen | G06F 21/31 |
| 2018/0069847 A1* | 3/2018 | Potnuru | H04L 63/08 |
| 2018/0176215 A1* | 6/2018 | Perotti | H04W 76/10 |
| 2019/0130093 A1* | 5/2019 | He | G06F 21/31 |

* cited by examiner

AUDIO ACCESSIBILITY ASSISTANCE

The present application claims priority to U.S. Prov. Appl. No. 62/596,567, filed Dec. 8, 2017, which is incorporated by reference herein in its entirety.

BACKGROUND

Technical Field

This disclosure relates generally to computer systems, and, more specifically, to providing audio content to users.

Description of the Related Art

People frequently rely on computing devices to supplement aspects of modern life. For example, we may use our mobile devices to communicate with one another, entertain ourselves, access various sources of information, etc. For someone who is visually impaired, however, interacting with a computing device can prove to be more difficult as it may impossible to read information presented on a traditional visual display. As a result, various techniques have been developed to assist visually impaired users. For example, a computing device may include a refreshable braille display capable of providing tactile feedback to the user. A computing device may also provide information to the user auditorily.

SUMMARY

The present disclosure describes embodiments in which a computing device includes an audio circuit and first and second processors. In various embodiments, the first processor executes software that produces a visual content presented on a display of the computing device. In some embodiments, this visual content may include a visual prompt asking a user to perform some action, such as providing login credentials. The first processor may send a request to the second processor controlling access to the audio circuit to ask that the second processor cause the audio circuit to play corresponding audio content via a speaker of the computing device such as audio prompt asking the user to provide the login credentials.

Figure 1:
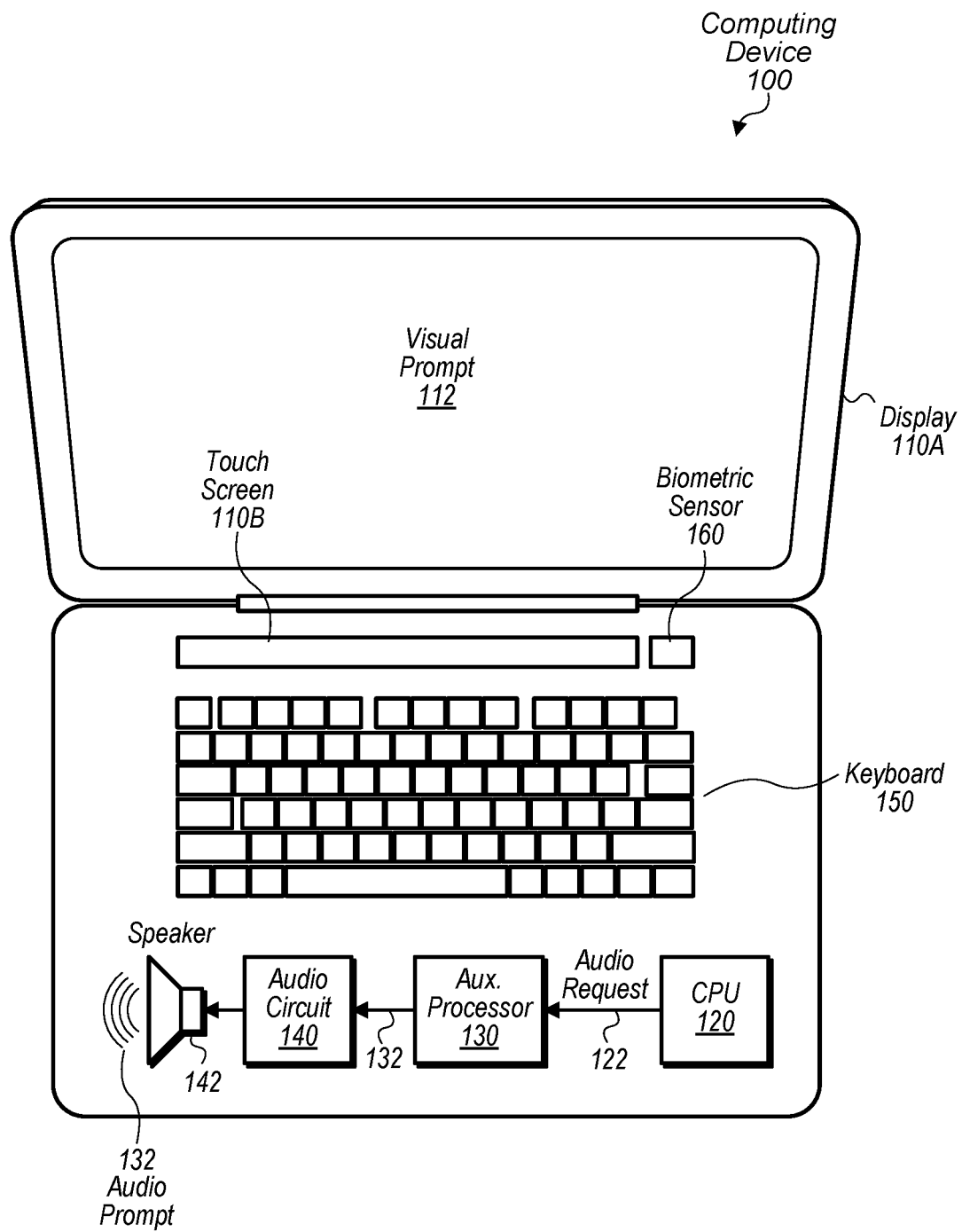
FIG. 1 is a diagram illustrating an example of a computing device configured to provide audio prompts via an audio circuit controlled by an auxiliary processor.

This disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "display configured to present a visual prompt" is intended to cover, for example, hardware having circuitry that performs this function during operation, even if the hardware in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible. Thus, the "configured to" construct is not used herein to refer to a software entity such as an application programming interface (API).

The term "configured to" is not intended to mean "configurable to." An unprogrammed FPGA, for example, would not be considered to be "configured to" perform some specific function, although it may be "configurable to" perform that function and may be "configured to" perform the function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the terms "first," "second," etc. are used as labels for nouns that they precede, and do not imply any type of ordering (e.g., spatial, temporal, logical, etc.) unless specifically stated. For example, in a processor having eight processing cores, the terms "first" and "second" processing cores can be used to refer to any two of the eight processing cores. In other words, the "first" and "second" processing cores are not limited to processing cores 0 and 1, for example.

As used herein, the term "based on" is used to describe one or more factors that affect a determination. This term does not foreclose the possibility that additional factors may affect a determination. That is, a determination may be solely based on specified factors or based on the specified factors as well as other, unspecified factors. Consider the phrase "determine A based on B." This phrase specifies that B is a factor used to determine A or that affects the determination of A. This phrase does not foreclose that the determination of A may also be based on some other factor, such as C. This phrase is also intended to cover an embodiment in which A is determined based solely on B. As used herein, the phrase "based on" is thus synonymous with the phrase "based at least in part on."

DETAILED DESCRIPTION

Because a visually-impaired user may be unable to view the content depicted on a display, a visually-impaired user may be more susceptible to being deceived by a malicious actor controlling a computing device. For example, a visually-impaired user may believe that he or she has navigated to a merchant's website to make a purchase. A malicious actor, however, may have redirected the user's browser to an alternative website attempting to collect the user's payment information. While a user capable of seeing the display might detect something is awry, a visually-impaired user may be unable to do so. Still further, if the visually-impaired user relies on audio prompts to indicate what is being displayed in the user's browser, a malicious actor may attempt to exploit these prompts by, for example, playing an audio prompt to indicate that the user is visiting a merchant's web site when the user, in fact, is visiting a malicious website.

The present disclosure describes in embodiments in which an additional, separate processor is employed to control access to an audio circuit (e.g., a sound card) of a computing device. As will be described in greater detail below, a computing device may execute software on a first processor (e.g., a central processing unit (CPU)) that generates visual content presented on a display. Instead of allowing the first processor to directly interact with the device's audio circuit, in various embodiments, a second processor (e.g., an auxiliary processor) is included in the computing device to control access to the audio circuit. In such an embodiment, the first processor makes requests to the second processor to play audio content via the audio circuit such as an audio prompt corresponding to the visual prompt being displayed. In various embodiments, the second processor may employ one or more techniques to verify the integrity of requests received from the first processor. For example, in some embodiments, the second processor may verify the integrity of the software running on the first processor. In some embodiments, the second processor may verify a digital signature present in the first processor's request and signed by a trusted authority. In some embodiments, the second processor may restrict when audio content can be requested and played. In some embodiments, the second processor may control access to the display and be aware of what is being presented on the display. In various embodiments, the second processor also executes a second, separate operating system from the operating system executing on the first processor in order to account for the situation in which the operating system executing on the first processor becomes compromised.

Although various embodiments will be described below within the context of visual impairment, it is noted that such techniques may also be applicable to situations in which a user is not visually impaired. For example, in some embodiments, a user accessing a merchant website may receive a visual prompt specifying a particular amount to be paid using a payment service, such as Apple Pay®. To ensure that the presented amount is correct, a separate audio prompt may be presented via the second processor to announce the amount and ask the user to confirm it.

Turning now to FIG. 1, a block diagram of a computing device 100 is depicted. In the illustrated embodiment, computing device includes a display 110A, touch screen 110B, central processing unit (CPU) 120, auxiliary processor 130, audio circuit 140 coupled to a speaker 142, keyboard 150, and biometric sensor 160. In some embodiments, computing device 100 may be implemented differently than shown. For example, computing device 100 may not include touch screen 110B and/or biometric sensor 160. In some embodiments, processor 120 may be implemented using a processor other than a CPU. Additional elements of computing device 100 are also discussed below with respect to FIG. 2.

In various embodiments, displays 110A and 110B are configured to present visual content such as various visual prompts 112 soliciting inputs from a user. For example, as will be described below with respect to FIG. 4A, visual prompt 112 may be a login screen, which asks a user to provide one or more login credentials such as providing a user name and password via keyboard 150 or a biometric credential via biometric sensor 160. In some embodiments, this login screen may allow a user to access computing device 100, content in computing device 100, functionality of an application running on computing device 100, etc. As another example discussed below with respect to FIG. 4B, in some embodiments, visual prompt 112 is a prompt to authorize a transaction that presents transaction information for about the transaction to be conducted by the user and asks the user to authorize the transaction. As still another example discussed below with respect to FIG. 4C, in some embodiments, visual prompt 112 is a prompt presented on touch screen 110B. This prompt 112 may include one or more selectable items such as buttons, check boxes, etc. In some embodiments, prompt 112 may provide other forms of content such as content from a web browser, content from files (e.g., text from a document file), content from a game, etc. As will be described in greater below with respect to FIG. 2, visual prompts 112 may be generated by software executing on CPU 120. Display 110A (as well as display 110B) may correspond to any suitable type of display such as a light-emitting diode (LED) panel, organic LED (OLED) panel, liquid-crystal display (LCD), cathode-ray tube (CRT) display, etc.

In various embodiments, audio circuit 140 is configured to present various audio content via a speaker 142 such as audio prompts 132. In some embodiments, audio prompts 132 correspond to content in visual prompts 112 and are presented to assist a user, who may be visually impaired as noted above. For example, in some embodiments in which visual prompt 112 is a login screen, audio prompts 132 may instruct a user to type a user name and a password into keyboard 150. In such an embodiment, prompts 132 may also speak the keys being typed by the user as the user selects the keys. Alternatively, prompt 132 may ask a user to present a biometric credential (e.g., a user's finger) to biometric sensor 160 in order to authenticate the user. In some embodiments in which visual prompt 112 pertains to a transaction being conducted by the user, audio prompts 132 may present details of the transaction such as identifying the payee (e.g., the merchant), the transaction amount, the currency, the product or service being purchased, etc. Audio prompts 132 may also instruct the user to authorize the transaction by, for example, selecting a particular key on keyboard 150 (e.g., the return key), providing a password, or presenting a biometric credential to biosensor 160. In some embodiments in which a visual prompt 112 is presented on touch screen 110B, audio prompts 132 may be presented to assist a user in selecting what is displayed on screen 110B. For example, a user may touch a particular location of screen 110B, and a corresponding prompt 132 may announce what is at that location (e.g., the button underneath the user's finger). Audio prompts 132 may also announce other content associated with visual prompts 112 such as the content in webpage, content from a file, etc. Audio circuit 140 may correspond to and/or include any of various hardware configured to produce sound via speaker 142 such as a sound card, digital-to-analog converters (DACs), amplifiers, filters, digital signal processors (DSPs), etc. In various embodiments, auxiliary processor 130 may facilitate rendering audio prompts such as loading and providing audio file content, performing speech synthesis, etc.

As noted above, in various embodiments, CPU 120 may not be able to directly interact with audio circuit 140; rather, in the illustrated embodiment, CPU 120 makes audio requests 122 to auxiliary processor 130, which controls access to audio circuit 140. Audio requests 122 may take any of various forms. Accordingly, in some embodiments, CPU 120 may provide the actual audio content in a request 122, which processor 130 may pass to audio circuit 140 without modification. In some embodiments, CPU 120 may identify a particular audio file in a request 122, and processor 130 may read the file and cause its contents to be played via audio circuit 140. In some embodiments processor 130 may execute a speech synthesizer (e.g., Apple's Siri®) that converts text to spoken audio played by audio circuit 140, and CPU 120 may provide the text to be spoken in an audio prompt 132. As noted above and will be discussed in greater detail below, in various embodiments, auxiliary processor 130 is also configured to perform one or more actions to verify the integrity of audio requests 122 received from CPU 120 in order to mitigate actions by a malicious actor. These actions may include validating the software that generates visual prompts 112, having a third party verify a request 122, or controlling access to a display such as touch screen 110B. In various embodiments, these actions also may include auxiliary processor 130 restricting what can be requested in an audio request 122 and when it can be requested. For example, a malicious actor John Smith might attempt to drown out a valid audio prompt 132 announcing a transaction with John Smith by having CPU 120 request playing a fake prompt 132 indicating the transaction was with a trusted entity (e.g., Apple.com). In such an embodiment, auxiliary processor 130 may be configured to bar CPU 120 from playing additional audio content once an audio prompt 132 has been requested and until it has been played. Thus, the malicious actor would be prevented from having the fake prompt played simultaneously with the valid prompt 132. Processor 130 may also execute a separate operating system than the one executed by CPU 120.

Figure 2:
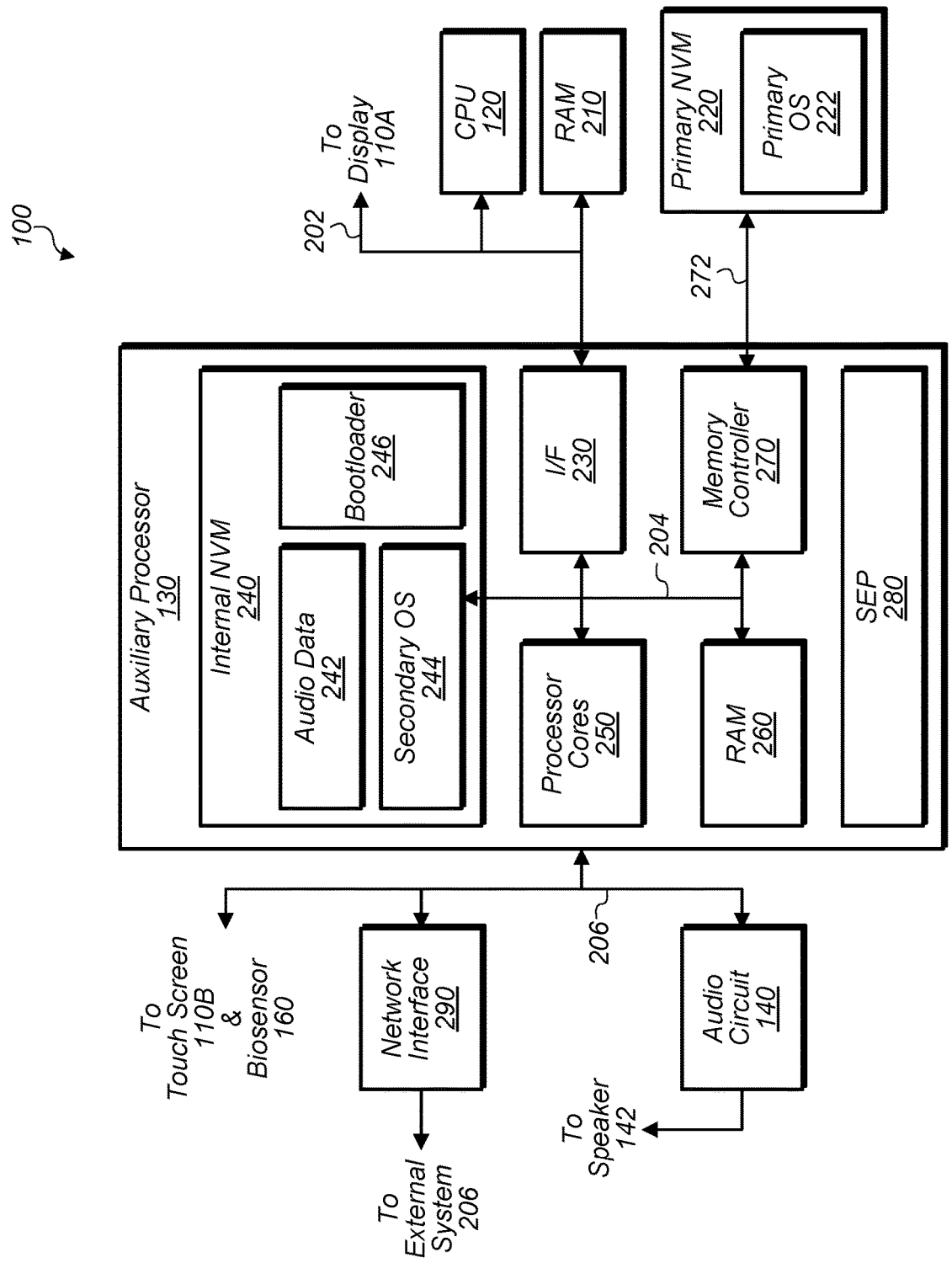
FIG. 2 is a block diagram illustrating exemplary components within the computing device.

Turning now to FIG. 2, a block diagram of components within computing 100 is depicted. In addition to components 110A-160, computing 100 includes RAM 210, primary non-volatile memory (NVM) 220, which includes a primary operating system (OS) 222. In some embodiments, auxiliary processor 130 is a system on a chip (SoC), which, in the illustrated embodiment, includes an interface 230 (coupled to elements 120 and 210 via interconnect 202), internal NVM 240, processor cores 250, RAM 260, memory controller 270, and secure enclave processor 280 coupled together via an interconnect 204. In the illustrated embodiment, NVM 240 includes audio data 242, secondary OS 244, and bootloader 246. Computing device 100 also includes a network interface 290 coupled via interconnect 206 to auxiliary processor 130, touch screen 110B, audio circuit 140, and biosensor 160. As noted above, in some embodiments, computing device 100 may be implemented differently than shown. For example, elements stored in internal NVM 240 may be stored in primary NVM 220, elements stored in NVM 220 may be in NVM 240, elements within auxiliary processor 130 may be external to processor 130, etc.

As noted above, in various embodiments, visual prompts 112 and requests 122 are produced by software executed by CPU 120. Accordingly, in some embodiments, these prompts 112 and/or audio requests 122 are generated by primary OS 222, which may be the main/principal operating system of computing device 100—in contrast to second OS 244 discussed below. For example, primary OS 222 may maintain the file system in primary NVM 220—the primary non-volatile storage of computing device 100 in some embodiments. Primary OS 222 may also handle task scheduling on CPU 120. As shown in the illustrated embodiment and discussed below, CPU 120 may not be able to access primary NVM 220 directly, but rather relies on auxiliary processor 130 to use memory controller 270 to read data, such as primary OS 222, from NVM 220 into RAM 210. Auxiliary processor 130 may also store and verify the bootloader 246, which may be the bootloader executable to boot primary OS 222.

In various embodiments, auxiliary processor 130 communicates with CPU 120 via Interface 230, which is configured to implement a bus interface for interconnect 202. Interface 230 may support any suitable bus protocol such as enhanced serial peripheral interface (eSPI) or peripheral component interconnect (PCI) express. In some embodiments, interconnect 202 may also be a combination of interconnects using multiple protocols. In various embodiments, CPU 120 may provide audio requests to interface 230, which may deliver the requests to processor cores 250 (or some other component within auxiliary processor 130) via a direct memory access (DMA) controller.

To facilitate generating audio prompts 132, auxiliary processor 130 may maintain audio data 242. In some embodiments, audio data 242 includes audio files corresponding to various audio prompts 132. For example, audio data 242 may include a first audio file containing spoken content asking for login credentials and a second audio file announcing that the user has been successfully authenticated. In such an example, CPU 120 may request that auxiliary processor 130 play the first file when presenting a corresponding visual prompt 112 and the second file when presenting the user's home screen. In some embodiments, audio data 242 includes program instructions of a speech synthesizer executable by processor cores 250 to convert text to spoken content for an audio prompt 132. For example, CPU 120 might provide the text "Please enter your password," and the speech synthesizer may produce the corresponding spoken content to be played by audio circuit 140. In some embodiments, audio data 242 may be a component of secondary OS 244.

In some embodiments, functionality described herein with respect to auxiliary processor 130 is implemented by a secondary OS 244 executing on processor cores 250. Secondary OS 244 may be a separate operating system from primary OS 222 and kept in isolation from CPU 120 in order to prevent a malicious actor executing software on CPU 120 from tampering with OS 244. In the illustrated embodiment, OS 244 is isolated from CPU 120 by being stored in internal NVM 240; in other embodiments, however, OS 244 may be stored in a protected portion of primary NVM 220 that is inaccessible to CPU 120. In some embodiments, secondary OS 244 may handle servicing audio requests 122 and generating corresponding audio prompts 132. Secondary OS 244 may also perform actions to increase the integrity of audio requests 122 such as verifying bootloader 246 and instructing memory controller 270 to retrieve data from primary NVM 220 for CPU 120.

As noted above, bootloader 246 may be executable to boot primary OS 222 on CPU 120 and, in some embodiments, is compliant with the Unified Extensible Firmware Interface (UEFI) specification. In various embodiments, auxiliary processor 130 initially verifies the integrity of bootloader 246 prior to providing it to CPU 120 for execution. In some embodiments, this verification includes confirming bootloader 246 complies with a digital signature, which may be generated by a manufacturer of device 100. In some embodiments, bootloader 246 may be considered as a part of primary OS 222 and may be responsible for generating visual prompts 112 to facilitate logging in a user and enabling access to primary NVM 220.

In various embodiments, memory controller 270 is configured facilitate access to primary NVM 220 by components of auxiliary processor 130 as well as CPU 120. Accordingly, memory controller 270 may include a memory management unit (MMU) configured to implement a virtual memory and/or a memory physical interface (PHY) configured to directly interface with NVM 220. In various embodiments, memory controller 270 also includes a cryptographic engine configured to encrypt data being stored in NVM 220 and decrypt data being read from NVM 220. As noted above, in some embodiments, a cryptographic key derived by SEP 280 from a user's password (and a key internal to SEP 280 in some embodiments) may be used. In one embodiment, this derived key may be used to directly encrypt data on NVM 220; in others embodiments, this key may be maintained by SEP 280 and used to decrypt a set of encrypted keys, which, in turn, are used by the cryptographic engine to encrypt and decrypt data in NVM 220.

In various embodiments, SEP 280 is a secure circuit configured to perform cryptographic services (such as providing memory controller 270 with a cryptographic key) as well as authenticate a user by comparing biometric data collected by biosensor 160. As used herein, the term "secure circuit" refers to one of a class of circuits that is configured to perform one or more services and return an authenticated response to an external requester. A result returned by a secure circuit is considered to have indicia of trust exceeding that of a circuit that merely returns a result without any form of authentication. In some embodiments, responses from SEP 280 are authenticated through the use of cryptography such as providing a digital signature or encrypted data. In some embodiments, response from SEP 280 are authenticated by being communicated through a trusted commination channel such as a dedicated bus between SEP 280 and the other party or a mailbox mechanism discussed below. In contrast, a circuit such as a hardware accelerator that merely operates on some received value and returns a result would not be considered a secure circuit within the meaning of this application. By authenticating results that are returned, such as by signing with a verifiable digital signature, a secure circuit may thus provide anti-spoofing functionality. Additionally, in some cases, a secure circuit may be said to be "tamper-resistant," which is a term of art referring to mechanisms that prevent compromise of the portions of the secure circuit that perform the one or more services. As will be described below with respect to FIG. 3, in some embodiments, SEP 280 includes a filter and a mailbox mechanism to provide tamper resistance to other internal circuitry within SEP 280 such as biosensor pipeline that is configured to verify biometric data collected by biosensor 160. SEP 280 may also only execute firmware signed by a trusted authority and isolated from elements external to SEP 280.

In various embodiments, biosensor 160 is configured to collect biometric data for a user of computing device 100 in order to authenticate the user. Biometric data may be data that uniquely identifies the user among other humans (at least to a high degree of accuracy) based on the user's physical or behavioral characteristics. For example, in some embodiments, sensor 160 is a finger print sensor that captures fingerprint data from the user. In some embodiments, SEP 280 may maintain previously captured fingerprint data of an authorized user and compare it against newly received fingerprint data from sensor 160 in order to authenticate a user. (In another embodiment, biosensor 160 may perform the comparison.) If the fingerprint data matches, SEP 280 may permit performance of a requested service such as logging into computing device 100 or performing a transaction. In some embodiments, communications between SEP 280 and biosensor 160 may be encrypted using a key shared between SEP 280 and biosensor 160 such that another circuit (e.g., a processor core 250) is unable to view communicated fingerprint data. In some embodiments, other types of biometric data may be captured by sensor 160 such as voice recognition (identifying the particular user's voice), iris scanning, other body part recognition, etc. Accordingly, in some embodiments, biosensor 160 is a camera sensor, which may include an infrared (IR) emitter and an IR camera that are configured to capture multiple flood and depth image frames of a user's face. When capturing a flood frame, the IR emitter may emit light from a single source, and the IR camera may collect two-dimensional image data from the user's face. When capturing a depth image frame, the IR emitter may project multiple light sources onto the user's face, and the IR camera may capture the reflections of those light sources to determine multiple depth points indicating distances from the IR camera to respective portions of the user's face. In some embodiments, the combination of flood and depth image data may allow for SEP 280 to compare faces in a three-dimensional space. In other embodiments, biosensor 160 is configured to capture a two-dimensional image in the visible-light spectrum. It is noted that SEP 280 may also compare information collected from sources other than sensor 160 in order to verify the identity of a user in some embodiments such as keyboard 150.

In addition to controlling access to audio circuit 140, auxiliary processor 130 may control access to other components of computing device 100. Accordingly, in the illustrated embodiment, auxiliary processor 130 is also configured to control access to network interface 290 and touch screen 110B.

Figure 4A:
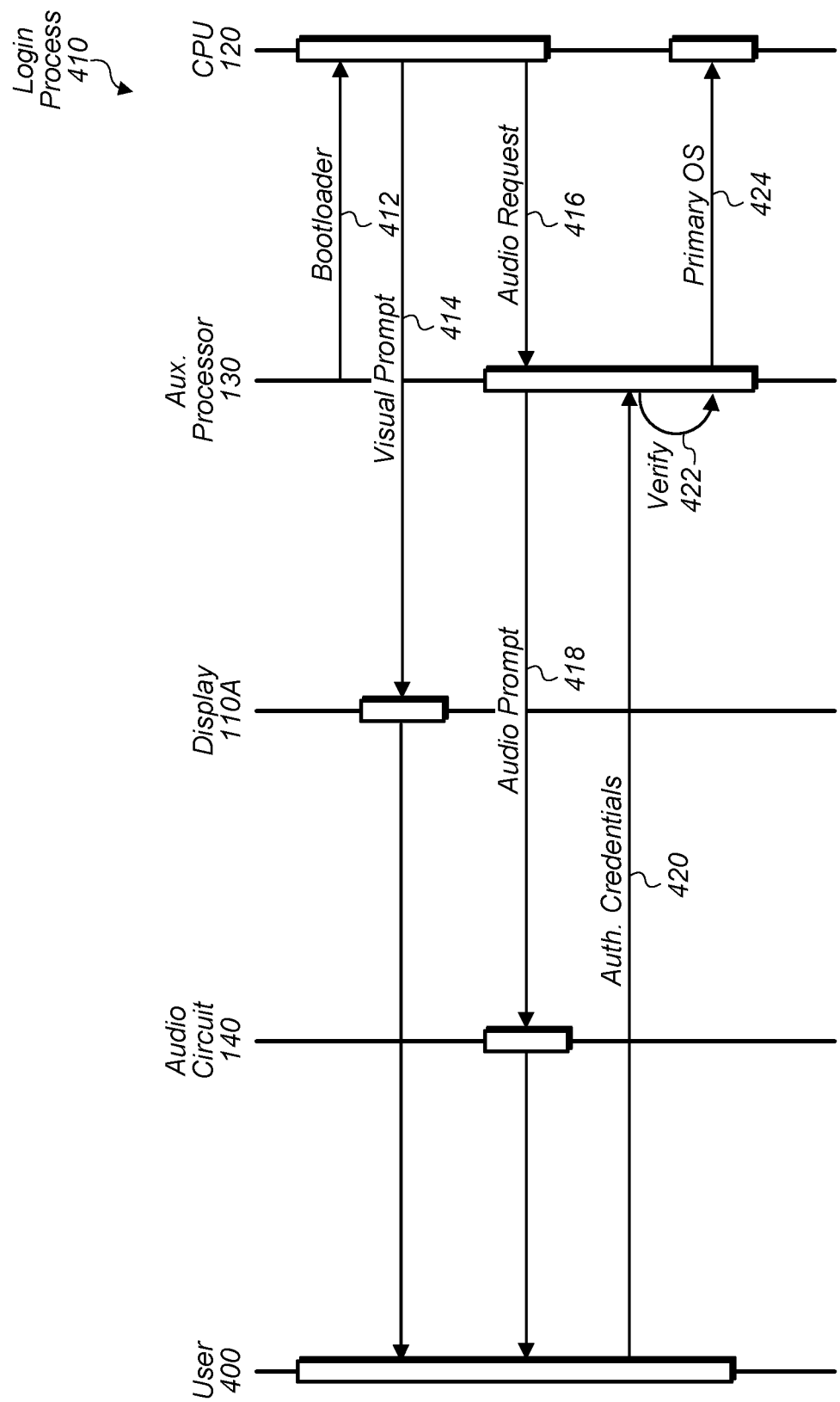
FIG. 4A is a communication diagram illustrating an exemplary exchange associated with a login process.
Figure 4B:
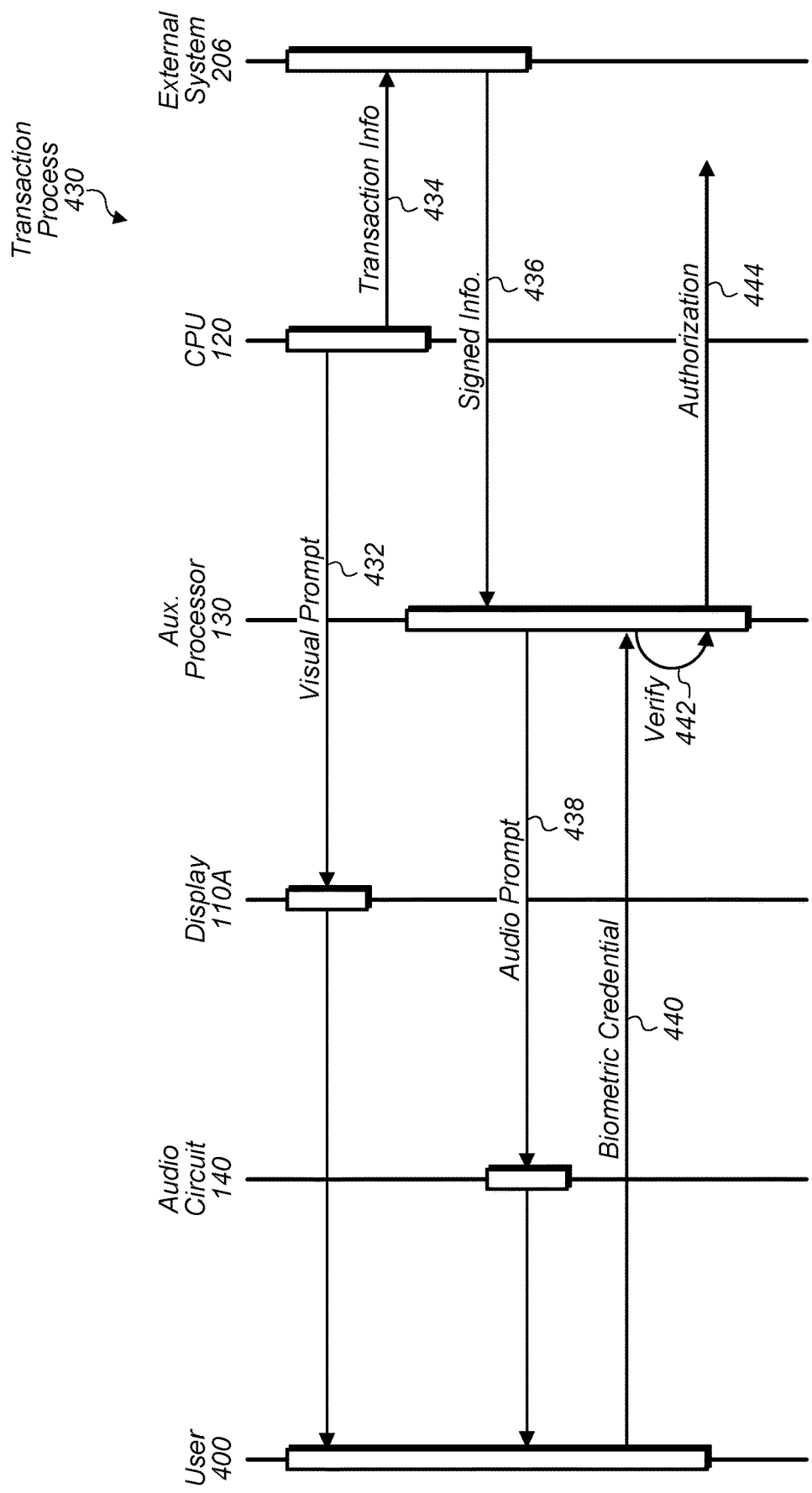
FIG. 4B is a communication diagram illustrating an exemplary exchange associated with a transaction process.

Network interface 290, in various embodiments, is configured to facilitate communications between computing device 100 and external systems 292 such as for conducting a transaction as discussed with respect to FIG. 4B. Accordingly, CPU 120 may issue a request to transmit data via network interface 290, and auxiliary processor 130 may deliver the data to interface 290 for transmission. Interface 290 may correspond to any suitable network interface. In some embodiments, wireless network interface 290 is a wireless local area network (WLAN) interface such as a Wi-Fi™ interface or Bluetooth™ interface. In some embodiments, interface 290 is a near field communication (NFC) interface. In some embodiments, interface 136 is a wide area network (WAN) such as a cellular interface. Interface 290 may also be a wired interface, in some embodiments, such as an Ethernet interface, Fibre Channel interface, etc.

Figure 3:
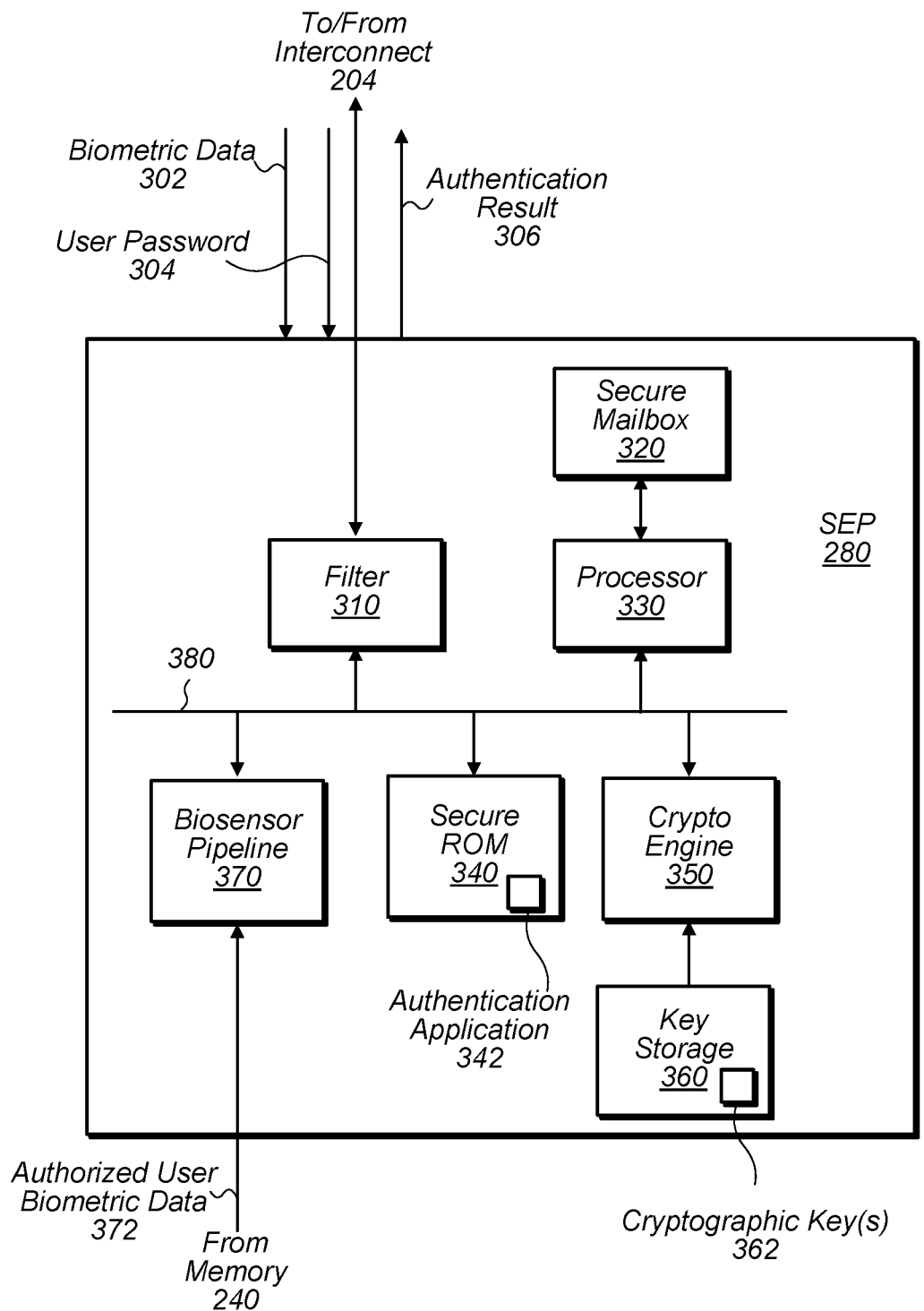
FIG. 3 is a block diagram illustrating an example of a secure enclave processor included in the computing device.

Turning now to FIG. 3, a block diagram of SEP 280 is depicted. In the illustrated embodiment, SEP 280 includes a filter 310, secure mailbox 320, processor 330, secure ROM 340, cryptographic engine 350, a key storage 360, and a biosensor pipeline 370 coupled together via an interconnect 380. In some embodiments, SEP 280 may include more (or less) components than shown in FIG. 3. As noted above, SEP 280 is a secure circuit having tamper resistance. As discussed below, SEP 280 implements tamper resistance through the use of filter 310 and secure mailbox 320. (In some embodiments, interface 230 may include a filter and a secure mailbox in order to make auxiliary processor 130 a secure circuit.)

Filter 310 is circuitry configured to tightly control access to SEP 280 to increase the isolation of the SEP 280 from the rest of the auxiliary processor 130 (as well as computing device 100), and thus the overall security of the device 100. More particularly, in one embodiment, filter 310 may permit read/write operations from a core 250 (or other peripherals coupled to interconnect 204) to enter SEP 280 only if the operations address the secure mailbox 320. Other operations may not progress from the interconnect 204 into SEP 280. Even more particularly, filter 310 may permit write operations to the address assigned to the inbox portion of secure mailbox 320, and read operations to the address assigned to the outbox portion of the secure mailbox 320. All other read/write operations may be prevented/filtered by the filter 310. In some embodiments, filter 310 may respond to other read/write operations with an error. In one embodiment, filter 310 may sink write data associated with a filtered write operation without passing the write data on to local interconnect 380. In one embodiment, filter 310 may supply nonce data as read data for a filtered read operation. Nonce data (e.g., "garbage data") may generally be data that is not associated with the addressed resource within the SEP 280. Filter 310 may supply any data as nonce data (e.g. all zeros, all ones, random data from a random number generator, data programmed into filter 310 to respond as read data, the address of the read transaction, etc.).

In various embodiments, filter 310 may only filter incoming read/write operations. Thus, the components of the SEP 280 may have full access to the other components of auxiliary processor 130 (as well as device 100) including cores 250, memory 240, memory controller 270, and/or biosensor 160. Accordingly, filter 310 may not filter responses from interconnect 204 that are provided in response to read/write operations issued by SEP 280.

Secure mailbox 320 is circuitry that, in some embodiments, includes an inbox and an outbox. Both the inbox and the outbox may be first-in, first-out buffers (FIFOs) for data. The buffers may have any size (e.g. any number of entries, where each entry is capable of storing data from a read/write operation). Particularly, the inbox may be configured to store write data from write operations sourced from auxiliary processor 130. The outbox may store write data from write operations sourced by processor 330. (As used herein, a "mailbox mechanism" refers to a memory circuit that temporarily stores 1) an input for a secure circuit until it can be retrieved by the circuit and/or 2) an output of a secure circuit until it can be retrieved by an external circuit.)

In some embodiments, software executing on processor cores 250 may request services of SEP 280 via an application programming interface (API) supported by operating system 244—i.e., a requester may make API calls that request services of SEP 280. These calls may cause corresponding requests to be written to mailbox mechanism 320, which are then retrieved from mailbox 320 and analyzed by processor 330 to determine whether it should service the requests. Accordingly, this API may be used to deliver biometric data 302 and authorization indication 306 to mailbox 320, request authentication of a user by verifying this information, and delivering an authentication result 306 via mailbox 320. By isolating SEP 280 in this manner, integrity of SEP 280 may be enhanced.

SEP processor 330 is configured to process commands received from various sources in computing device 100 and may use various secure peripherals to accomplish the commands. Processor 330 may then execute instructions stored in ROM 340 such as authentication application 342 to perform an authentication of a user. For example, SEP processor 330 may execute application 342 to provide appropriate commands to biosensor sensor pipeline 370 in order to verify biometric data 302. In some embodiments, application 342 may include encrypted program instructions loaded from a trusted zone in memory 240 or 220. In some embodiments, program instructions executed by SEP processor 330 are signed by a trusted authority (e.g., device 100's manufacturer) in order to ensure their integrity.

Secure ROM 340 is a memory configured to store program instruction for booting SEP 280. In some embodiments, ROM 340 may respond to only a specific address range assigned to secure ROM 340 on local interconnect 380. The address range may be hardwired, and processor 330 may be hardwired to fetch from the address range at boot in order to boot from secure ROM 340. Filter 310 may filter addresses within the address range assigned to secure ROM 340 (as mentioned above), preventing access to secure ROM 340 from components external to the SEP 280. In some embodiments, secure ROM 340 may include other software executed by SEP processor 330 during use. This software may include the program instructions to process inbox messages and generate outbox messages, etc.

Cryptographic engine 350 is circuitry configured to perform cryptographic operations for SEP 280, including key generation as well as encryption and decryption using keys in key storage 360. Cryptographic engine 350 may implement any suitable encryption algorithm such as DES, AES, RSA, etc. In some embodiments, engine 350 may further implement elliptic curve cryptography (ECC). In various embodiments, engine 350 is responsible for deriving a cryptographic key used to decrypt content in primary NVM 220. In some embodiments, this key may be derived from a user's password 304 and cryptographic key 362 in storage 360. In various embodiments, engine 350 also decrypts traffic received from biosensor 160.

Key storage 360 is a local memory (i.e., internal memory) configured to store cryptograph keys 362. In some embodiments, these keys may include keys used to establish the secure channels between SEP 280 and elements such as biosensor 160. In some embodiments, keys 362 may include a key used to produce a digital signature authorizing a transaction such as discussed with FIG. 4B.

Biosensor sensor pipeline 370, in one embodiment, is circuitry configured to compare biometric data 302 captured by biosensor 160 from a user being authenticated with biometric data 372 of an authorized user. (In another embodiment, data 302 and 327 may be compared by software such as authentication application 342.) In some embodiments in which data 302 is collected from a user's face, pipeline 370 may perform the comparison using a collection of neural networks included in pipeline 370, each network being configured to compare biometric data 302 captured in a single frame with biometric data 372 captured in multiple frames for an authorized user. As shown, pipeline 370 may be configured to read, from memory 240, biometric data 372, which may be protected by encryption in some embodiments or being stored in an associated part of memory 240 that is only accessible to SEP 280. (In another embodiment, SEP 280 may store data 372 internally.) Based on the comparison of biometric data 302 and 372, SEP 280 may provide an authentication result 306 indicating whether the authentication was successful or failed.

Turning now to FIG. 4A, a communication diagram of a login process 410 is depicted. As noted above, in some embodiments, computing device 100 may present a visual prompt 112 (such as a login screen) and a corresponding audio prompt 132 as part of a process to authenticate a user. Login process 410 is one embodiment of such a process.

Process 410 may begin at 412 with auxiliary processor 130 verifying and providing bootloader 412 to CPU 120, which may execute bootloader 412 to begin booting primary OS 222. In response to executing bootloader 412, CPU 120 may provide visual prompt 112 at 414 to display 110A to cause it to display the prompt 112 to a user 400. CPU 120 may also send an audio request 122 to auxiliary processor 130 to ask that it provide an audio prompt 132. As noted above, in some embodiments, this request may identify an audio file to be played or text to be synthesized into to spoken content. At 418, auxiliary processor 130 provides the audio prompt 418 to audio circuit 140 to cause it to be played to user 400. At 420, a user may provide authentication credentials, such as a user name and password 304, which are verified at 422 by auxiliary processor 130. As noted above, in some embodiments, this may include SEP 280 deriving a cryptographic key used to decrypt content on primary NVM 220 including primary OS 222. At 424, auxiliary processor 130 provides primary OS 222 to CPU 120 for execution.

Turning now to FIG. 4B, a communication diagram of a transaction process 430 is depicted. As noted above, in some embodiments, computing device 100 may present a visual prompt 112 and a corresponding audio prompt 132 as part of a transaction process. Transaction process 430 is one embodiment of such a process.

Process 430 may begin at 432 with CPU 120 presenting a visual prompt 112 pertaining to the transaction to display 110A for presentation to a user 400. As noted above, in some embodiments, this prompt 112 may present various transaction information such as identifying the payee (e.g., the merchant), the transaction amount, the currency, the product or service being purchased, etc. At 434, CPU 120 may also send the transaction information to an external system 292, which may be a trusted, third-party server able to verify the information and sign the information. At 436, this signed information may be delivered to auxiliary processor 130, which may verify the signed by verifying a digital signature included in the signed information. In response to a successful verification, the auxiliary processor 130 may provide at 438 an audio prompt 132 including the signed information to audio circuit 140 to cause it to play the audio prompt 132 to the user 400. As noted above, this audio prompt 422 may identify the transaction information along with a request for the user to authorize the transaction. As noted above, in some embodiments, auxiliary processor 130 may bar CPU 120 from playing additional audio content once it has made an initial request 122 and until transaction process 430 completes. Thus, if a malicious actor has CPU 120 provide a malicious prompt during process 430, auxiliary processor 130 prevents that prompt being played. At 440, a user may provide a biometric credential (e.g., a user's finger or face) to biosensor 160, which may be convey the credential information to auxiliary processor 130. At 442, processor 130 (or more specifically SEP 280 in some embodiments) may verify the credential information and, in response to a successful verification, provide an indication that the transaction has been authorized. This indication may include, for example, providing payment information via network interface 290 to a merchant system such as a merchant's website or a merchant's NFC reader.

Figure 4C:
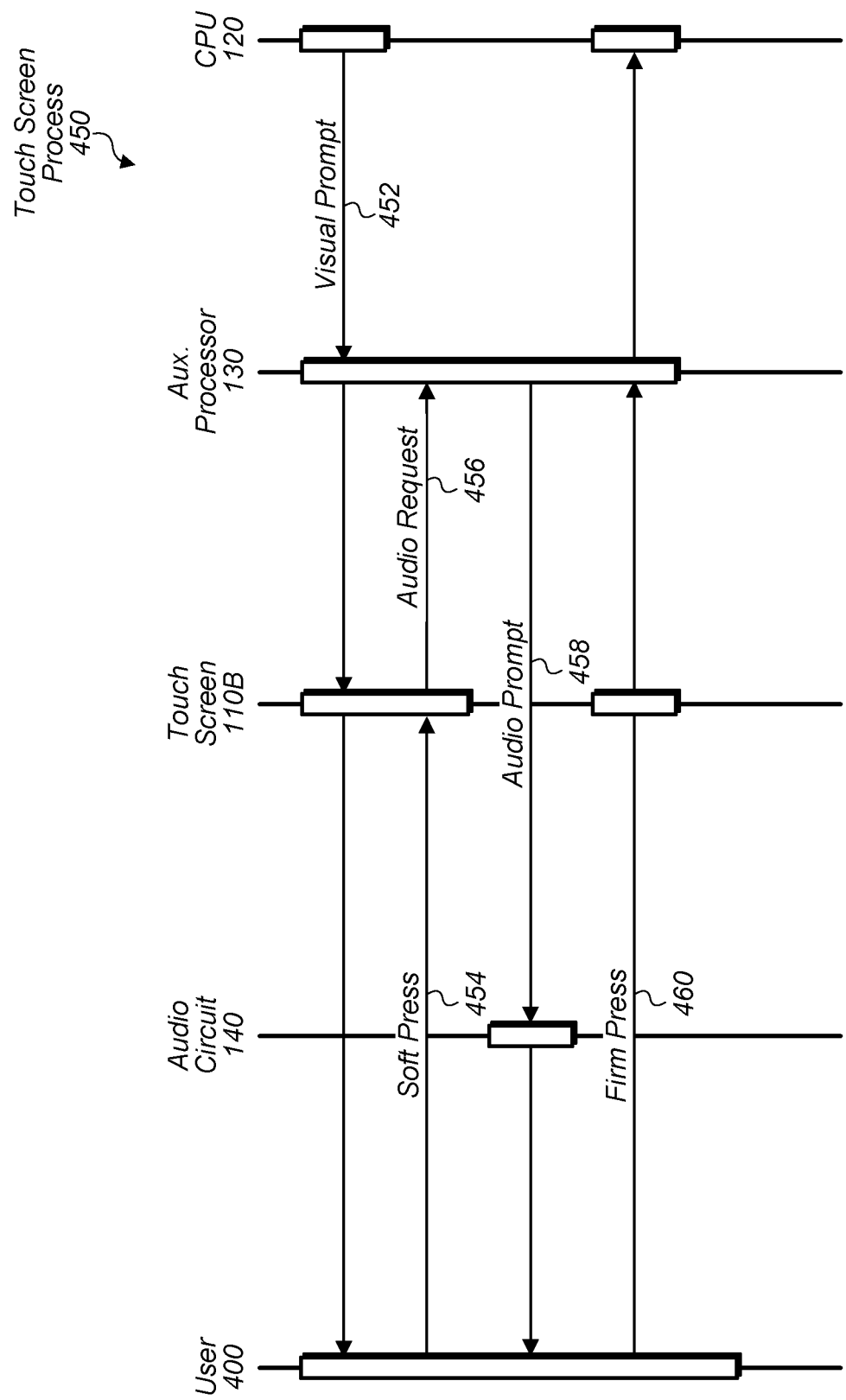
FIG. 4C is a communication diagram illustrating an exemplary exchange associated with a touch-screen process.

Turning now to FIG. 4C, a communication diagram of a touch-screen process 450 is depicted. As noted above, in some embodiments, computing device 100 may present a visual prompt 112 on touch screen 110B and a corresponding audio prompt 132 when a user presses a particular location. Touch-screen process 450 is one embodiment of such a process when prompts 112 and 132 are presented.

Process 450 may begin at 452 with CPU 120 sending a visual prompt 112 to auxiliary processor 130, which, as noted above, may control access to touch screen 110B. Auxiliary processor 130 may then convey prompt 112 to display 110B for presentation to a user 400. As noted above, this prompt 112 may depict one or more selectable items such as buttons. At 454, a user may touch a particular location of screen 110B, which may be detected by screen 110B along with the amount of pressure being applied. In response to the user performing a soft press, screen 110B may send a request at 456 to auxiliary processor 456 to play an audio prompt 132 corresponding to where the press occurred. At 458, auxiliary processor 130 may convey the corresponding audio prompt 132 to audio circuit 140 for presentation to the user 400. As noted above, this prompt 132 may, for example, identify the contents of the button underneath the user's finger. In response to the user pressing location more firmly at 460, touch screen 110B may notify auxiliary processor 130 of the firm press, and processor 130, in turn, may notify CPU 120.

Figure 5A:
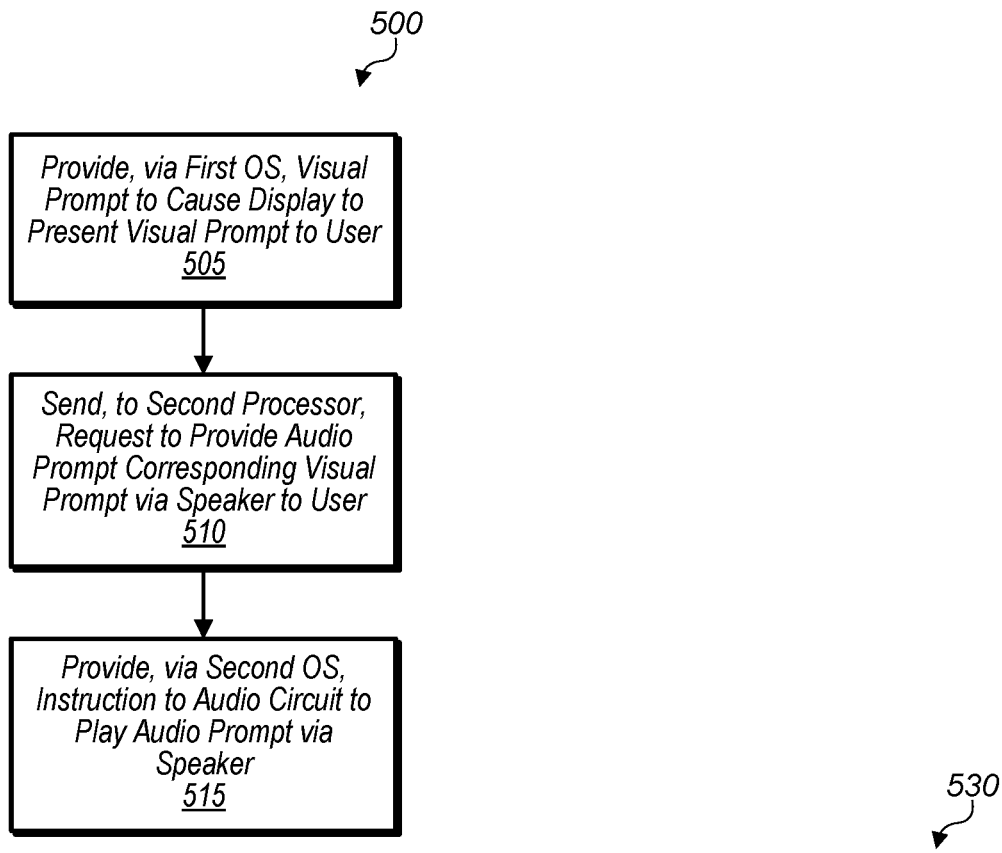
FIG. 5A-5C are flow diagrams illustrating examples of methods performed by the computing device.

Turning now to FIG. 5A, a flow diagram of a method 500 is depicted. Method 500 is one embodiment of a method performed by a computing device having an audio circuit and first and second processors such as computing device 100. In some instances, performance of method 500 may reduce the likelihood that a malicious actor can exploit use of the audio circuit.

In step 505, the first processor (e.g., CPU 120) provides, via a first operating system (e.g., primary OS 222) of the computing device, a visual prompt (e.g., prompt 112) to the display to cause the display to present the visual prompt to a user. In various embodiments, the visual prompt is a login screen soliciting a user for login credentials usable to access the computing device. In some embodiments, the second processor evaluates login credentials received from the user and indicates, to the first processor, whether the evaluated login credentials correspond to login credentials of an authorized user. In some embodiments, the second processor includes a memory controller (e.g., controller 270) configured to access a memory storing a file system of the first operating system. In such an embodiment, the second processor provides, in response to the evaluated login credentials corresponding to the login credentials of the authorized user, content of the file system to the first processor. In some embodiments, the second processor evaluates the login credentials received from the user by deriving a cryptographic key from the login credentials received from the user and decrypts the content of the file system with the derived cryptographic key prior to providing the content of the file system to the first processor.

In step 510, the first processor sends, to the second processor (e.g., auxiliary processor 130), a request (e.g., request 122) to provide an audio prompt (e.g., audio prompt 132) corresponding to the visual prompt via the speaker to the user. In some embodiments, the request identifies text to be spoken in the audio prompt, and the second processor implements a speech synthesizer that converts the text to spoken content and provide the spoke content to the audio circuit to play as the audio prompt. In some embodiments, the request identifies an audio file corresponding to the audio prompt, and the second processor retrieves the audio file from a memory coupled to the second processor and provides content of the audio file to the audio circuit to play as the audio prompt. In some embodiments, the audio prompt indicates that the user is being solicited for login credentials In step 515, the second processor provides, in response to the request and via a second operating system (e.g., secondary OS 244), an instruction to the audio circuit to play the audio prompt via the speaker. In some embodiments, the first processor provides content from the visual prompt to a server configured to verify the content and sign the content, and step 515 includes the second processor verifying a digital signature included in the signed content by the server and, in response to verifying the digital signature, including the signed content in the audio prompt. If, however, this verification is unsuccessful, the second processor does not provide the instruction to the audio circuit to play the audio prompt. In some embodiments, the signed content identifies details of a transaction being conducted by the user. In some embodiments, a touch-sensitive display (e.g., touch screen 110B) included in the computing device is configured to detect a location where a user is touching the display, and the second processor identifies content being presented by the touch-sensitive display at the detected location and provides, via the second operating system, an instruction to the audio circuit to play an audio prompt indicating the identified content.

Figure 5B:
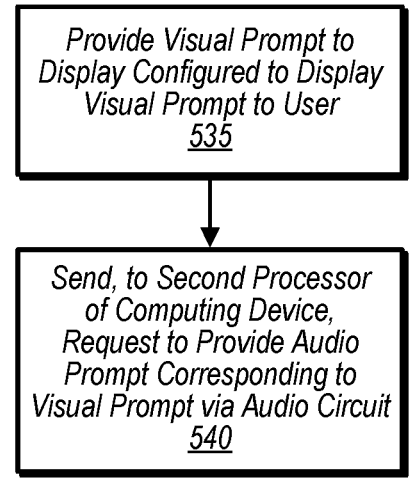

Turning now to FIG. 5B, a flow diagram of a method 530 is depicted. Method 530 is one embodiment of a method performed by a software executing on a first processor of a computing device having an audio circuit such as bootloader 246. In some instances, performance of method 530 may reduce the likelihood that a malicious actor can exploit use of the audio circuit.

In step 535, a visual prompt (e.g., visual prompt 112) is provided to a display (e.g., display 110A) configured to display the visual prompt to a user. In some embodiments, a bootloader (e.g., bootloader 246) executable by the first processor boots a first operating system distinct from a second operating system executed by the second processor. In some embodiments, the bootloader is executable to generate the visual prompt to solicit login credentials for the first operating system, and the audio prompt indicates that the visual prompt solicits login credentials.

In step 540, a request (e.g., audio request 122) is sent to a second processor of the computing device to provide an audio prompt (e.g., audio prompt 132) corresponding to the visual prompt via an audio circuit (e.g., audio circuit 140). In such an embodiment, the second processor is configured to control access of the audio circuit by the first processor. In some embodiments, the visual prompt asks the user to confirm details of a transaction to be conducted wireless by the computing device. In such an embodiment, step 540 may include sending the details to a server (e.g., external system 292) configured to verify the details and provide signed audio data about the details and including the signed audio data in the request sent to the second processor. In some embodiments, a computer readable medium storing program instructions to perform method 530 is a memory (e.g., internal NVM 240 storing bootloader 246) included in the second processor.

Figure 5C:
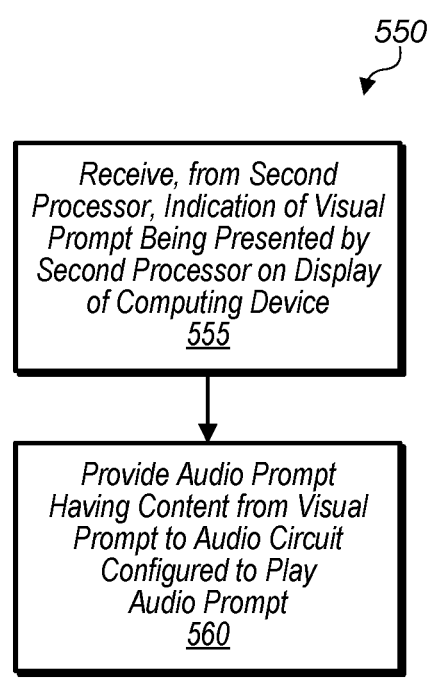

Turning now to FIG. 5C, a flow diagram of a method 550 is depicted. Method 550 is one embodiment of a method performed by processor that controls access to an audio circuit, such as auxiliary processor 130. In some instances, performance of method 550 may reduce the likelihood that a malicious actor can exploit use of the audio circuit.

In step 555, a first processor (e.g., auxiliary processor 130 or processor cores 250 in processor 130) receives, from a second processor (e.g., CPU 120), an indication of a visual prompt (e.g., visual prompt 112) being presented by the second processor on a display (e.g., display 110A) of a computing device. In some embodiments, a bootloader (e.g., bootloader 246) executable by the second processor boots an operating system (e.g., primary OS 222) on the second processor and presents the visual prompt to solicit login credentials for the operating system. In some embodiments, the first processor performs a verification of the bootloader to verify an integrity of the bootloader and, based on the verification, provides the bootloader to the second processor for execution. In some embodiments, the first processor executes a first operating system (e.g., OS 244) distinct from a second operating (OS 222) executable by the second processor.

In step 560, the first processor provides an audio prompt (e.g., audio prompt 132) having content from the visual prompt to an audio circuit (e.g., audio circuit 140) of the computing device that is configured to play the audio prompt. In some embodiments, the indication identifies text present in the visual prompt, and step 560 includes the first processor producing spoken content from the text by performing speech synthesis on the text and including the spoken content in the provided audio content.

Exemplary Computer System

Figure 6:
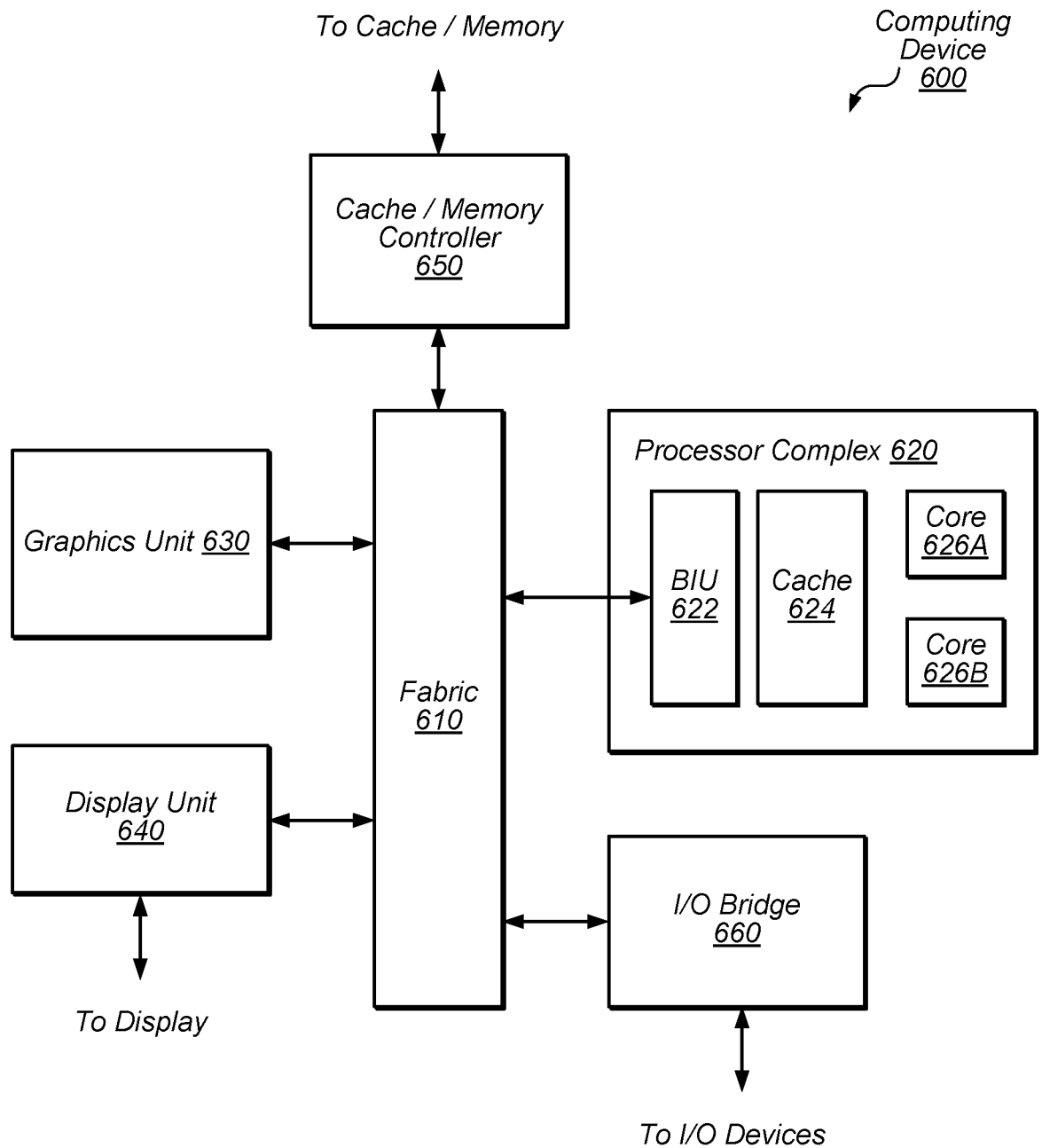
FIG. 6 is a block diagram illustrating one embodiment of an exemplary computer system.

Turning now to FIG. 6, a block diagram illustrating an exemplary embodiment of a device 600 is shown. In some embodiments, elements of device 600 may be included within computing device 100 (or elements of computing device 100 may implement functionality described with respect to device 600). In some embodiments, device 600 may be included in a mobile device, which may be battery-powered. Therefore, power consumption by device 600 may be an important design consideration. In the illustrated embodiment, device 600 includes fabric 610, processor complex 620, graphics unit 630, display unit 640, cache/memory controller 650, input/output (I/O) bridge 660.

Fabric 610 may include various interconnects, buses, MUX's, controllers, etc., and may be configured to facilitate communication between various elements of device 600. In some embodiments, portions of fabric 610 may be configured to implement various different communication protocols. In other embodiments, fabric 610 may implement a single communication protocol and elements coupled to fabric 610 may convert from the single communication protocol to other communication protocols internally. As used herein, the term "coupled to" may indicate one or more connections between elements, and a coupling may include intervening elements. For example, in FIG. 6, graphics unit 630 may be described as "coupled to" a memory through fabric 610 and cache/memory controller 650. In contrast, in the illustrated embodiment of FIG. 6, graphics unit 630 is "directly coupled" to fabric 610 because there are no intervening elements. In some embodiments, interconnects 202, 204, 206, or 272 and interface 230 may implement functionality described with respect to fabric 610 (and/or I/O bridge 660 discussed below).

In the illustrated embodiment, processor complex 620 includes bus interface unit (BIU) 622, cache 624, and cores 626A and 626B. In various embodiments, processor complex 620 may include various numbers of processors, processor cores and/or caches. For example, processor complex 620 may include 1, 2, or 4 processor cores, or any other suitable number. In one embodiment, cache 624 is a set associative L2 cache. In some embodiments, cores 626A and/or 626B may include internal instruction and/or data caches. In some embodiments, a coherency unit (not shown)

in fabric 610, cache 624, or elsewhere in device 600 may be configured to maintain coherency between various caches of device 600. BIU 622 may be configured to manage communication between processor complex 620 and other elements of device 600. Processor cores such as cores 626 may be configured to execute instructions of a particular instruction set architecture (ISA), which may include operating system instructions and user application instructions. These instructions may be stored in computer readable medium such as a memory coupled to memory controller 650 discussed below. In some embodiments, processors 120, 130, or 250 may implement functionality described with respect to complex 620.

Graphics unit 630 may include one or more processors and/or one or more graphics processing units (GPU's). Graphics unit 630 may receive graphics-oriented instructions, such as OPENGL®, Metal, or DIRECT3D® instructions, for example. Graphics unit 630 may execute specialized GPU instructions or perform other operations based on the received graphics-oriented instructions. Graphics unit 630 may generally be configured to process large blocks of data in parallel and may build images in a frame buffer for output to a display. Graphics unit 630 may include transform, lighting, triangle, and/or rendering engines in one or more graphics processing pipelines. Graphics unit 630 may output pixel information for display images.

Display unit 640 may be configured to read data from a frame buffer and provide a stream of pixel values for display. Display unit 640 may be configured as a display pipeline in some embodiments. Additionally, display unit 640 may be configured to blend multiple frames to produce an output frame. Further, display unit 640 may include one or more interfaces (e.g., MIPI® or embedded display port (eDP)) for coupling to a user display (e.g., a touchscreen or an external display). In some embodiments, displays 110A and 110B may be implement functionality with respect to display unit 640 or interact with a display unit 640.

Cache/memory controller 650 may be configured to manage transfer of data between fabric 610 and one or more caches and/or memories. For example, cache/memory controller 650 may be coupled to an L3 cache, which may in turn be coupled to a system memory. In other embodiments, cache/memory controller 650 may be directly coupled to a memory. In some embodiments, cache/memory controller 650 may include one or more internal caches. Memory coupled to controller 650 may be any type of volatile memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR4, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an integrated circuit in a chip-on-chip configuration, a package-on-package configuration, or a multi-chip module configuration. Memory coupled to controller 650 may be any type of non-volatile memory such as NAND flash memory, NOR flash memory, nano RAM (NRAM), magneto-resistive RAM (MRAM), phase change RAM (PRAM), Racetrack memory, Memristor memory, etc. As noted above, this memory may store program instructions executable by processor complex 620 to cause device 600 to perform functionality described herein. In some embodiments, memory controller 270 may implement functionality described with respect to controller 650; memories 210, 220, 240, and 260 may implement functionality described with respect to the memories coupled to controller 650.

I/O bridge 660 may include various elements configured to implement universal serial bus (USB) communications, security, audio, and/or low-power always-on functionality, for example. I/O bridge 660 may also include interfaces such as pulse-width modulation (PWM), general-purpose input/output (GPIO), serial peripheral interface (SPI), and/or inter-integrated circuit (I2C), for example. Various types of peripherals and devices may be coupled to device 600 via I/O bridge 660. For example, these devices may include various types of wireless communication (e.g., wifi, Bluetooth, cellular, global positioning system, etc.), additional storage (e.g., RAM storage, solid state storage, or disk storage), user interface devices (e.g., keyboard, microphones, speakers, etc.), etc.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A computing device, comprising:
a display;
an audio circuit coupled to a speaker;
first and second processors;
memory having first program instructions stored therein that are executable by the first processor to:
provide, via a first operating system of the computing device, a visual prompt to the display to cause the display to present the visual prompt to a user; and
send, from the first processor to the second processor, a request to provide an audio prompt corresponding to the visual prompt via the speaker to the user; and
memory having second program instructions stored therein that are executable by the second processor to:
verify, via a second operating system, the request sent from the first processor; and
in response to verifying the request, provide, via the second operating system, an instruction to the audio circuit to play the audio prompt via the speaker.

2. The computing device of claim 1, wherein the request identifies an audio file corresponding to the audio prompt; and
wherein the second program instructions are executable by the second processor to:
retrieve the audio file from a memory coupled to the second processor; and provide content of the audio file to the audio circuit to play as the audio prompt.

3. The computing device of claim 1, wherein the request identifies text to be spoken in the audio prompt; and
wherein the second program instructions are executable by the second processor to:
implement a speech synthesizer that converts the text to spoken content; and
provide the spoken content to the audio circuit to play as the audio prompt.

4. The computing device of claim 1, wherein the visual prompt is a login screen soliciting a user for login credentials usable to access the computing device, and wherein the audio prompt indicates that the user is being solicited for login credentials; and
wherein the second program instructions are executable by the second processor to:
evaluate login credentials received from the user; and
indicate, to the first processor, whether the evaluated login credentials correspond to login credentials of an authorized user.

5. The computing device of claim 4, wherein the second processor includes a memory controller configured to access a memory storing a file system of the first operating system; and
wherein the second program instructions are executable by the second processor to:
in response to the evaluated login credentials corresponding to the login credentials of the authorized user, provide content of the file system to the first processor.

6. The computing device of claim 5, wherein the second program instructions are executable by the second processor to:
evaluate the login credentials received from the user by deriving a cryptographic key from the login credentials received from the user; and
decrypt the content of the file system with the derived cryptographic key prior to providing the content of the file system to the first processor.

7. The computing device of claim 1, wherein the first program instructions are executable by the first processor to:
provide content from the visual prompt to a server configured to verify the content and sign the content; and
wherein the second program instructions are executable by second processor to:
verify a digital signature included in the signed content by the server; and
in response to verifying the digital signature, include the signed content in the audio prompt.

8. The computing device of claim 7, wherein the signed content identifies details of a transaction being conducted by the user.

9. The computing device of claim 1, further comprising:
a touch-sensitive display configured to detect a location where a user is touching the display; and
wherein the second program instructions are executable by the second processor to:
identify content being presented by the touch-sensitive display at the detected location; and
provide, via the second operating system, an instruction to the audio circuit to play an audio prompt indicating the identified content.

10. The computing device of claim 1, wherein the memory having the first program instructions and the memory having the second program instructions are different memories.

11. A non-transitory computer readable medium having program instructions stored therein that are executable by first and second processors of a computing device to cause the computing device to perform operations comprising:
providing, via a first operating system, a visual prompt to a display configured to display the visual prompt to a user; and
sending, by the first processor to the second processor of the computing device, a request to provide an audio prompt corresponding to the visual prompt via an audio circuit, wherein the second processor is configured to control access of the audio circuit by the first processor;
verifying, via a second operating system, the request sent from the first processor; and
in response to verifying the request, providing, via the second operating system, an instruction to the audio circuit to play the audio prompt.

12. The computer readable medium of claim 11, wherein the program instructions include program instructions of a bootloader executable by the first processor to boot the first operating system distinct from the second operating system executed by the second processor.

13. The computer readable medium of claim 12, wherein the bootloader is executable to generate the visual prompt to solicit login credentials for the first operating system, and wherein the audio prompt indicates that the visual prompt solicits login credentials.

14. The computer readable medium of claim 11, wherein the visual prompt asks the user to confirm details of a transaction to be conducted wirelessly by the computing device; and
wherein the operations further comprise:
send the details to a server configured to verify the details and provide signed audio data about the details; and
include the signed audio data in the request sent to the second processor.

15. The computer readable medium of claim 11, wherein the computer readable medium is a memory included in the second processor.

16. An integrated circuit, comprising:
a first processor; and
memory having program instruction stored therein that executable by the first processor to:
receive, from a second processor executing a second operating system, a request to provide an audio prompt having content associated with a visual prompt being presented via the second operating system on a display of a computing device;
perform, via a first operating system executing on the first processor, a verification associated with the received request; and
based on the verification, provide, via the first operating system, the audio prompt to an audio circuit of the computing device, wherein the audio circuit is configured to play the audio prompt.

17. The integrated circuit of claim 16, wherein the memory has program instructions stored therein of a bootloader executable by the second processor to boot the second operating system on the second processor, and to present the visual prompt to solicit login credentials for the second operating system.

18. The integrated circuit of claim 17, wherein the program instructions are executable by the first processor to:
perform a verification of the bootloader to verify an integrity of the bootloader; and based on the verification of the bootloader, provide the bootloader to the second processor for execution.

19. The integrated circuit of claim 16, wherein the request identifies text present in the visual prompt; and
wherein the program instructions are executable to:
produce spoken content from the text by performing speech synthesis on the text; and
include the spoken content in the provided audio prompt.

20. The integrated circuit of claim 16, wherein the program instructions include program instructions of the first operating system executable by the first processor, wherein the first operating system is distinct from the second operating executable by the second processor.

* * * * *